(12) United States Patent
Brown

(10) Patent No.: US 10,030,954 B2
(45) Date of Patent: Jul. 24, 2018

(54) BOWFISHING SHAFT ADAPTER

(71) Applicant: Brown Innovations LLC, London, KY (US)

(72) Inventor: Kevin E. Brown, London, KY (US)

(73) Assignee: BROWN INNOVATIONS, LLC, London, KY (US)

( * ) Notice: Subject to any disclaimer, the term of this patent is extended or adjusted under 35 U.S.C. 154(b) by 0 days.

(21) Appl. No.: 15/482,882

(22) Filed: Apr. 10, 2017

(65) Prior Publication Data

US 2017/0292820 A1 Oct. 12, 2017

Related U.S. Application Data

(60) Provisional application No. 62/320,904, filed on Apr. 11, 2016.

(51) Int. Cl.
| | |
|---|---|
| *F42B 6/04* | (2006.01) |
| *F41B 5/14* | (2006.01) |
| *A01K 81/00* | (2006.01) |
| *F42B 12/68* | (2006.01) |
| *F42B 12/36* | (2006.01) |

(52) U.S. Cl.
CPC .............. *F42B 12/68* (2013.01); *A01K 81/00* (2013.01); *F42B 6/04* (2013.01); *F42B 12/362* (2013.01); *F41B 5/1488* (2013.01)

(58) Field of Classification Search
CPC ........ F41B 5/1484; F41B 5/1488; F42B 6/04; F42B 6/06; A01K 81/00
USPC .................... 473/575, 578; 124/86
See application file for complete search history.

(56) References Cited

U.S. PATENT DOCUMENTS

| | | | |
|---|---|---|---|
| 1,794,051 A | 2/1931 | Allen et al. | |
| 2,467,838 A | 4/1949 | Lust et al. | |
| 4,905,397 A * | 3/1990 | Juelg, Jr. .................. | F42B 6/04 43/6 |
| 5,273,293 A | 12/1993 | Lekavich | |
| 5,417,439 A | 5/1995 | Bickel | |
| 5,553,413 A * | 9/1996 | Gannon .................. | A01K 81/00 43/6 |
| 5,987,724 A | 11/1999 | Kleman | |
| 6,129,642 A | 10/2000 | DonTigny | |
| 6,213,114 B1 | 4/2001 | Burkhart | |
| 6,517,453 B2 * | 2/2003 | LaSee ....................... | F42B 6/04 124/86 |
| 6,595,880 B2 | 7/2003 | Becker | |
| 7,331,886 B2 * | 2/2008 | Morris ....................... | F42B 6/06 473/578 |
| 7,758,457 B2 | 7/2010 | Marshall | |
| 7,922,609 B1 | 4/2011 | Hajari | |

(Continued)

*Primary Examiner* — Alexander Niconovich
(74) *Attorney, Agent, or Firm* — King & Schickli, PLLC

(57) ABSTRACT

An enhanced slide and a circumferential stop assembly for use with a bowfishing arrow may include matching shapes for engaging one another in use. The engagement of such matching shapes offers many improvements over conventional slide and stop assemblies, including an even circumferential distribution of impact between the slide and the stop as well as inhibiting relative longitudinal or rotational movement between the slide and stop assemblies. The stop assembly may further include a nock adapter for engaging a nock, thereby serving as a dual purpose adapter. For ease of use and installation, the stop assembly may be an outsert, meaning that it is adapted to fit snugly over an arrow shaft.

20 Claims, 9 Drawing Sheets

(56) References Cited

U.S. PATENT DOCUMENTS

| | | | |
|---|---|---|---|
| 8,267,815 B2* | 9/2012 | Braun | A63B 65/02 |
| | | | 473/578 |
| 8,622,855 B2 | 1/2014 | Bednar et al. | |
| 8,777,786 B1 | 7/2014 | Bay | |
| 8,915,806 B2 | 12/2014 | Asherman | |
| 8,951,152 B1 | 2/2015 | Huang | |
| 9,109,852 B1* | 8/2015 | Boester | F41B 5/1488 |
| 9,140,527 B2 | 9/2015 | Pedersen et al. | |
| 9,163,898 B2* | 10/2015 | Pedersen | F41B 5/1488 |
| 9,228,812 B1* | 1/2016 | White | F42B 6/04 |
| 9,395,145 B2* | 7/2016 | Woods, Jr. | F41B 5/1488 |
| 9,410,774 B1 | 8/2016 | Gallo | |
| 9,441,925 B1 | 9/2016 | Palomaki | |
| 9,551,553 B1 | 1/2017 | Boester et al. | |
| 2002/0198072 A1* | 12/2002 | LaSee | F42B 6/04 |
| | | | 473/578 |
| 2003/0045381 A1* | 3/2003 | Morris | F42B 6/06 |
| | | | 473/578 |
| 2014/0128183 A1 | 5/2014 | McPherson | |
| 2015/0018140 A1 | 1/2015 | Bednar et al. | |
| 2015/0024880 A1* | 1/2015 | Pedersen | F41B 5/1488 |
| | | | 473/575 |

\* cited by examiner

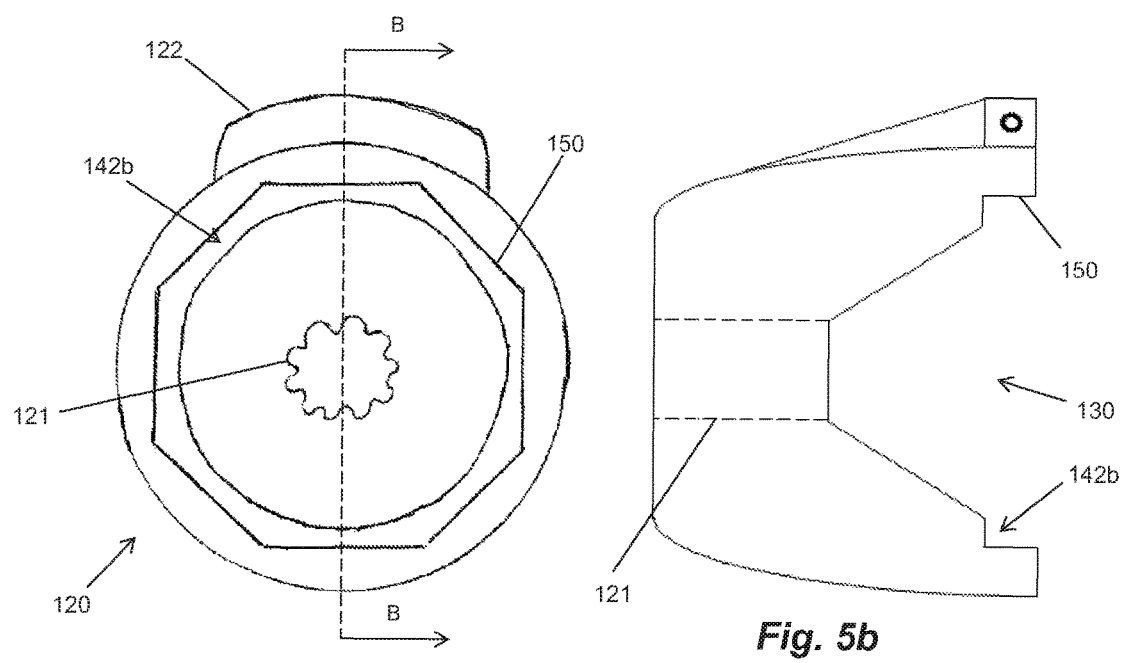
*Fig. 5a*
*Fig. 5b*
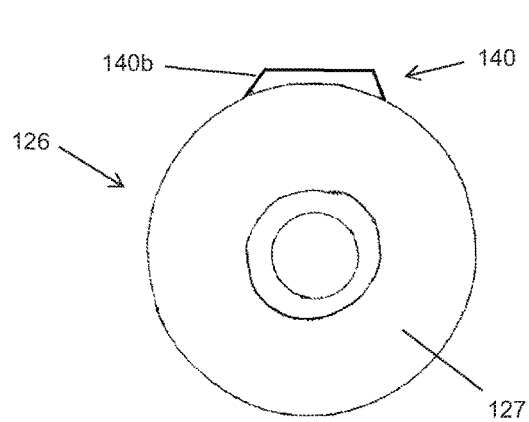
*Fig. 5c*
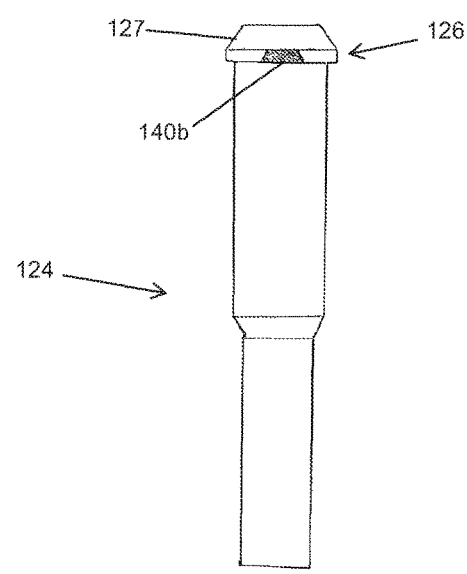
*Fig. 5d*

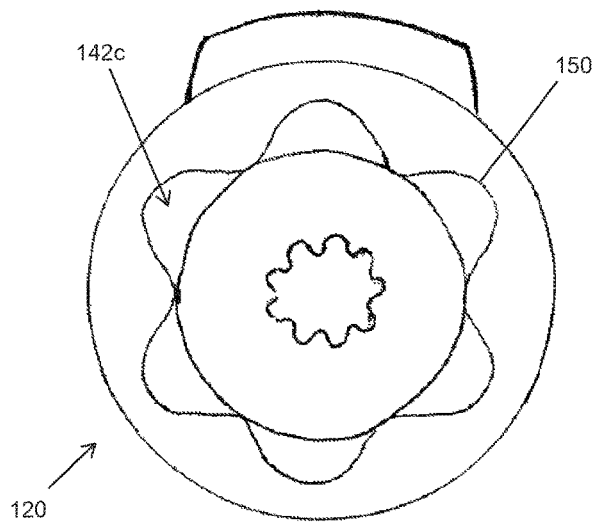
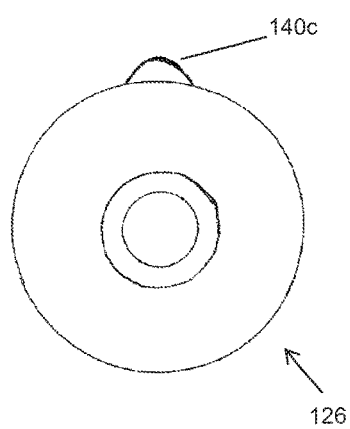
Fig. 6a          Fig. 6b
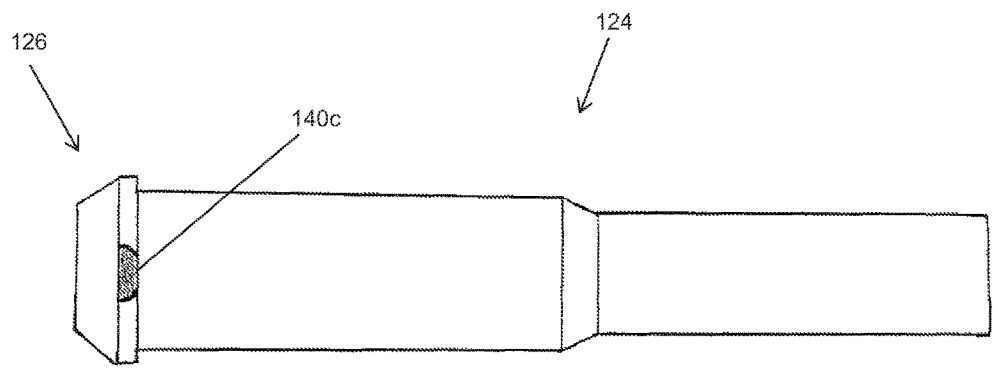
Fig. 6c

BOWFISHING SHAFT ADAPTER

This application claims priority to U.S. PROVISIONAL Application Ser. No. 62/320,904, filed Apr. 11, 2016, the disclosure of which is hereby incorporated by reference.

TECHNICAL FIELD

This invention generally relates to a projectile weapon, and more particularly to an adapter for use with a bowfishing arrow.

BACKGROUND OF THE INVENTION

Bowfishing involves the use of a bow and arrow to catch fish. Reference is made to FIGS. 1 and 2, which illustrate prior art bowfishing equipment. A bow 10 may be equipped with a cable 12, which may be used to fire an arrow including an arrow shaft 14. Many types of bows may be used in the sport of bowfishing, including recurve bows, hybrid cam bows, or crossbows. The arrow shaft may be solid and may be made of fiberglass-reinforced polymer, a fiberglass and carbon mix, or a carbon shaft. A typical diameter of a bowfishing arrow shaft is 5/16". These shafts may include an arrowhead end, which may be round, where the arrowhead may be attached, and may have a nock end, which may be tapered, conical, or flat, where a nock 18 may be attached.

The arrow may be connected to a line 22, which in turn may be connected to a reel. In order to attach the line 22 to the arrow shaft 14, a slide 20 may be provided on the shaft 14. The slide 20 may be adapted to move longitudinally along the shaft 14, which allows relative motion of the line 22 with respect to the arrow shaft, which may be useful in loading and firing the arrow. In order to prevent the slide 20, and therefore the line 22, from passing beyond the nock end of the arrow shaft, thereby detaching the line 22 from the arrow shaft 14, a stop 24 is provided. This stop 24 prevents further longitudinal movement of the slide 20 in a rearward direction.

With further reference to FIG. 2, a conventional slide 20 and stop 24 are illustrated. The slide 20 may include a tubular or annular body, and the stop 24 may include a simple projection extending radially from one portion of the shaft 14 and fixed thereto. In practice, the slide 20 may impact the stop 24 upon firing the arrow, but may bounce off said stop once the arrow has made contact with a target, such as a fish. In the event that a fish has been speared, the free longitudinal movement of the slide 20 with respect to the shaft 14 results in the line 22 also freely moving relative to the shaft, and hence the fish. This can lead to an uneven "pull" created between the fish and the fisherman as the line 22 may slide longitudinally on the arrow shaft 14 as the fish moves.

In addition, a stop 24 in the form of a single fixed radial projection, as is shown in FIG. 2, results a single area of the stop absorbing all contact from the slide 20, namely the upstanding wall on the arrowhead side of the stop 24. The shaft may include a threaded aperture to receive a stop, such as a shock pad, and an attachment screw. The stop may be approximately 1¼" from the nock end of the shaft. The stop may be in the form of a resilient pad that has a plate or cover that is secured to the arrow shaft with the attachment screw.

Repeated contact between the slide 20 and this relatively small surface area of the stop 24 may cause the stop to wear relatively quickly or unevenly. Moreover, the asymmetric force (with respect to the shaft) caused by the slide 20 repeatedly contacting the stop 24, often with high levels of force, may cause the stop 24 to begin to deform itself and/or the shaft, as the stop is urged to bend backward with each impact from the slide 20. Furthermore, this asymmetric extension of the stop in a single radial direction creates a less aerodynamic arrow as compared to an arrow without a stop.

Accordingly, a need has been identified for a bowfishing arrow with an improved slide and stop system which addresses these and other shortcomings of traditional bowfishing arrows.

SUMMARY OF THE INVENTION

In one embodiment, the invention generally relates to a bowfishing apparatus for use with an arrow shaft with an arrowhead portion and a nock end portion. The apparatus includes a slide assembly including an interior bore and a circumferential receiver tapering radially outward toward the nock end portion of the arrow shaft, said slide assembly adapted to slide longitudinally along and rotate about the arrow shaft. In addition, the assembly includes a stop assembly adapted to be fixedly attached to the arrow shaft, said stop assembly including a circumferential dampener tapering radially outward toward the nock end portion of the arrow shaft, said dampener adapted for at least partial insertion into the receiver of the slide assembly.

In one aspect, the stop assembly may further include a nock receiver for receiving at least a portion of a nock.

The stop assembly may be adapted for fixed attachment around a circumference of an outer surface of the shaft.

In another aspect, the circumferential receiver of the slide assembly may include a cavity with a first shape and the dampener of the stop assembly may include a dampener body with a second shape, wherein the first shape matches the second shape. The dampener may further include a projection, and the receiver may further include a recess for receiving the projection. The projection may be in the form of an O-ring adapted for insertion into the recess, thereby inhibiting longitudinal movement of the slide assembly. In a further aspect, the recess may comprise a wall defining a non-circular perimeter, and the projection may comprise an extension member adapted to engage at least a portion of the wall, wherein engagement of the extension member and the wall prevents relative rotation of the slide assembly and the stop assembly.

The circumferential receiver may include a first non-circular cross-section and the dampener may include a second non-circular cross-section matching the first non-circular cross-section. The first non-circular cross-section may be adapted for engaging the second non-circular cross-section, wherein engagement of the first non-circular cross-section with the second non-circular cross-section prevents relative rotation of the slide assembly and the stop assembly.

In another aspect of the invention, the apparatus may include a fastener for attaching the stop assembly to the shaft, wherein the stop assembly further includes an aperture on a radially outer surface of the stop assembly for receiving the fastener.

A further embodiment of the present invention relates to a bowfishing apparatus for use with a reel and bowfishing line. The apparatus includes an arrow shaft including an arrowhead end and a nock end and defining an outer surface, a slide assembly adapted for attachment to the bowfishing line and for longitudinal and rotational movement about the arrow shaft, and a stop assembly covering the nock end and a nock end portion of the outer surface of the arrow shaft. The stop assembly includes a dampener for engaging the slide assembly and preventing longitudinal movement of the slide assembly beyond the nock end and a nock receiver for receiving a nock.

In one aspect, the stop assembly may include a first section with a first inner diameter matching an outer diameter of the shaft, the first section for covering and contacting the nock end portion of the outer surface of the arrow shaft. The stop assembly may further include a second section, the second section extending beyond the nock end and including the nock receiver, said nock receiver defining a second inner diameter matching an outer diameter of at least a portion of the nock. The first inner diameter may be larger than the second inner diameter.

The slide assembly may include a line receiver for engaging the bowfishing line.

In another aspect, the slide assembly may include a circumferential receiver tapering outward toward the nock end, said circumferential receiver adapted for receiving the dampener. The dampener may comprise a circumferential dampener tapering radially outward toward the nock end of the arrow shaft, said circumferential dampener adapted for at least partial insertion into the circumferential receiver of the slide assembly. The circumferential receiver and the circumferential dampener may comprise matching frustoconical shapes. The circumferential receiver may comprise a concave shape and the circumferential dampener may comprise a matching convex shape.

The slide assembly may further include a recess and the dampener includes a projection adapted to engage the recess. In one aspect, the recess may comprise a circular recess within the circumferential receiver and the projection comprises an O-ring. In another aspect, the recess may comprise a wall defining a non-circular perimeter, and the projection may comprise an extension member adapted to engage at least a portion of the wall, wherein engagement of the extension member and the wall prevents relative rotation of the slide assembly and the stop assembly.

The nock receiver may be threadless and may be adapted to engage a threadless nock.

BRIEF DESCRIPTION OF THE DRAWINGS

FIG. 4b is a perspective view of a slide assembly for use with the stop assembly of FIG. 4a;
FIG. 5a is an end view of a further embodiment of a slide assembly;
FIG. 5b is a cross-section of the slide assembly of FIG. 5a along line B-B;
FIG. 5c is an end view of a stop assembly for use with the slide assembly of FIG. 5a;
FIG. 5d is a side view of the stop assembly of FIG. 5c;
FIG. 6a is an end view of a further embodiment of a slide assembly;
FIG. 6b is an end view of a stop assembly for use with the slide assembly of FIG. 6a;
FIG. 6c is a side view of the stop assembly of FIG. 6b;
FIG. 7b is an end view of a stop assembly for use with the slide assembly of FIG. 7a;

DETAILED DESCRIPTION OF THE INVENTION

The description provided below and in regard to the figures applies to all embodiments unless noted otherwise, and features common to each embodiment are similarly shown and numbered.

Figure 1:
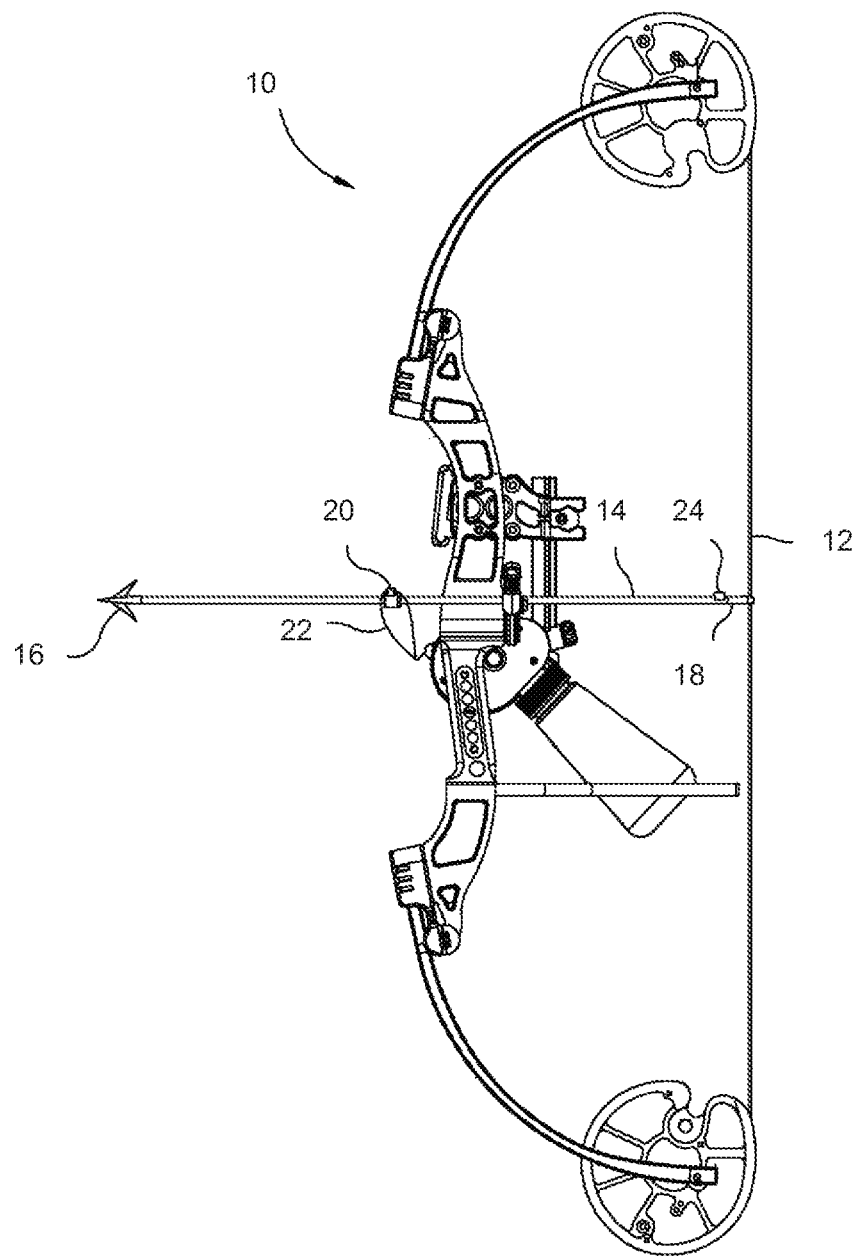
FIG. 1 is a bowfishing bow and arrow of the prior art.
Figure 2:
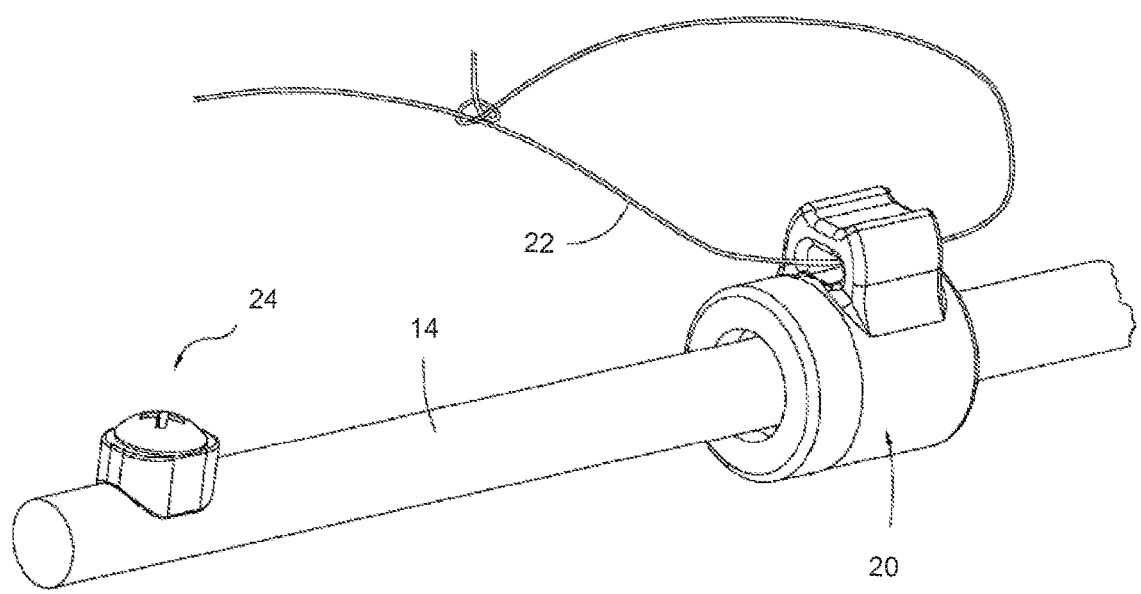
FIG. 2 is a detailed perspective view of the slide and stop assembly of the bowfishing arrow of FIG. 1.
Figure 3:
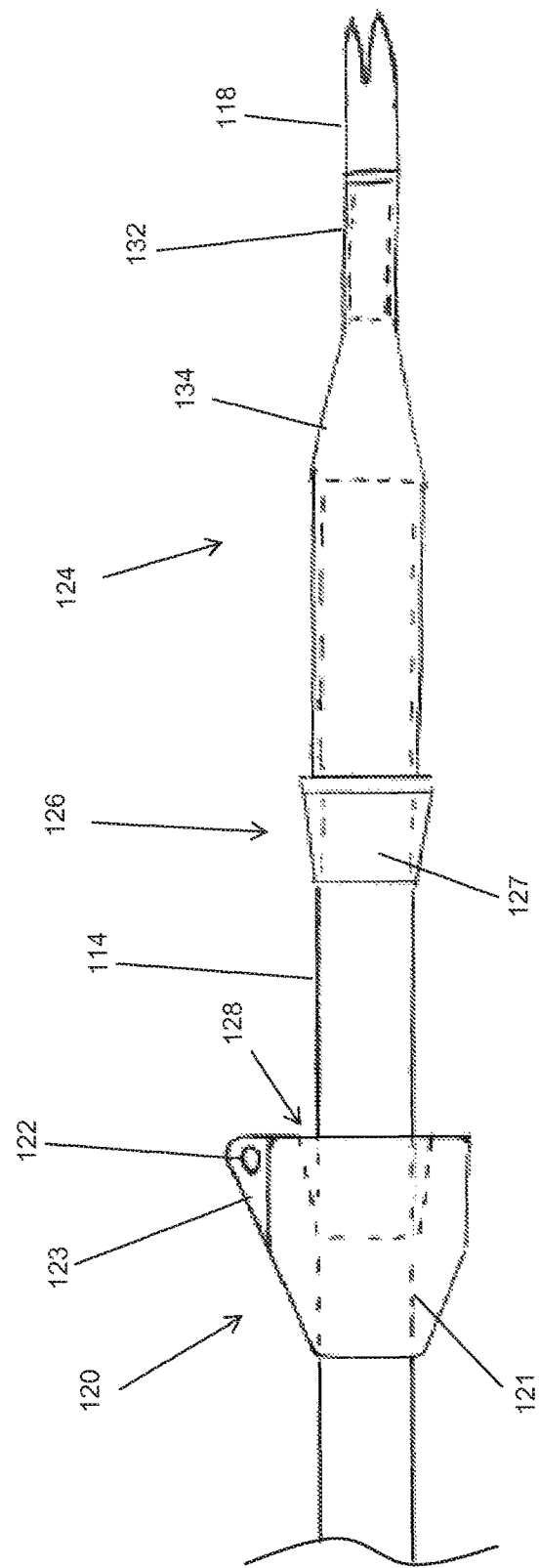
FIG. 3 illustrates a slide assembly and stop assembly according to one aspect of the invention.

With reference to FIG. 3, a bowfishing arrow shaft 114 is illustrated with a slide assembly 120. The slide assembly 120 may include an interior bore 121 adapted to slide over the shaft 114, thereby allowing relative longitudinal movement of the slide assembly 120 along the shaft. One or more line attachment points 122 may be provided, such as may be associated with one or more slide extensions 123 for attachment to the line. The extension 123 may encircle at least one third of the circumference of the slide assembly, which may spread the line outward away from the flared head of the stop assembly.

In addition, a stop assembly 124 is shown, which is adapted to stop the slide assembly 120 from moving longitudinally beyond the stop assembly 124. The stop assembly may be an outsert stop assembly which is adapted to fit over a top of the outer surface of the shaft 114 and be affixed thereto. This stop assembly 124 may contact an entirety of an outer circumference of the shaft, at least along a nock-end portion of the shaft. In one aspect, the stop assembly 124 may define a first stop assembly inner diameter which essentially matches the outer diameter of the shaft 114. In this respect, the stop assembly 124 is adapted to be fixedly attached to the shaft 114 preventing relative movement between the stop assembly 124 and the shaft 114.

The stop assembly 124 may be affixed to the shaft via an adhesive, a fastener (see, e.g. FIG. 9), a spring pin, a detent, a friction fitting, or other method of attachment. Attachment of the stop assembly 124 to the shaft without the use of a fastener (e.g. by use of adhesive or friction fit without a fastener) may reduce manufacturing costs because an arrow shaft may be used without the need for further processing in the form of creation of an aperture (such as a threaded aperture) for engaging the fastener. Attachment of the stop assembly 124 to the shaft via the use of a fastener may allow for use of a conventional arrow shaft which already includes an aperture for receiving a fastener, such as a threaded screw. In one aspect, the stop assembly may be adapted to fit arrows with different cross-sections. This may include being adapted to fit a circular arrow shaft or a non-circular arrow shaft, such as a shaft with a cross-section in the shape of a polygon, a rounded polygon, or a reuleaux triangle.

As is illustrated, the stop assembly 124 may include a first mating portion, such as dampener 126, which may be adapted to engage the slide assembly 120. The dampener 126 may include a dampener body 127 that may be circumferential in nature and may flare outward from the shaft 114 toward a nock end of the shaft in use. For example, the dampener 126 may be a frustoconical shape and flaring outward toward the nock end of the shaft 114 with the first stop assembly inner diameter therethrough. As the dampener 126 flares outward, the diameter of the dampener increases in size such that the slide assembly 120 may not pass beyond the dampener. The dampener may include a generally conical, ring, hump, or taper, which may include rounded or smoothed edges, and which may protrude radially outward so as to force the slide assembly to stop longitudinal movement. The stop assembly may be made of stainless steel, aluminum, titanium, brass, carbon, thermoplastic polymers, nylon, or the like.

The slide assembly 120 may include a second mating portion, such as slide receiver 128 for engaging or receiving the first mating portion of the stop assembly 124 (e.g. dampener 126). The slide receiver 128 may form a cavity 130 for receiving the dampener body 127. In one aspect, the slide cavity 130 may be a matching shape as the dampener body 127. For example, the slide cavity 130 of the slide assembly 120 may be frustoconical in shape, extending from a narrower circumference to a wider circumference as the cavity 130 extends toward the nock end of the shaft in order to receive a frustoconical dampener 126 as the slide assembly 120 contacts the stop assembly 124. In another aspect, the dampener body 127 may form a convex surface, and the cavity 130 may form concave surface matching convex surface of the dampener body.

The matching shapes of the dampener 126 and the receiver 128 assure a greater degree of engagement therebetween as compared to a conventional slide/stop engagement of the prior art in which the stop comprises a radially extending projection or post. The nature of the circumferential stop assembly engaging the circumferential slide assembly, thereby establishing 360 degrees of contact between stop assembly and slide assembly, distributes the impact of the slide engaging the stop around a circumference of both the slide and the stop, thereby distributing pressure and wear on the stop assembly and improving longevity thereof. The flared nature of the receiver 128 and the dampener 126, flaring radially outwardly from an arrowhead direction toward a nock direction, forms a wedge between the slide assembly and the stop assembly. This ensures a snugger fit as the slide impacts the stop, which inhibits relative movement therebetween. This thereby inhibits movement of the attachment point for the line with respect to a fish in use, and provides for a smoother "pull" for the fisherman upon spearing a fish. In addition, a tapered dampener may allow for a thinner profile than a "post-type" stop of the prior art, thereby creating a more aerodynamic and hydrodynamic arrow.

With further reference to FIG. 3, the stop assembly 124 may further include a nock adapter 132 for engaging a nock 118. The nock adapter 132 may be threadless, and may be adapted to engage a threadless nock. As illustrated, the nock adapter 132 may define a second stop assembly inner diameter of the stop assembly 124. This second stop assembly inner diameter may be smaller than the first stop assembly inner diameter. The stop assembly may include a tapered section 134 which connects the first stop assembly inner diameter to the second stop assembly inner diameter. This tapered section 134 may be adapted for placement beyond the nock end of the arrow shaft 114 as illustrated in FIG. 3, or may overlap a portion of a nock end of an arrow shaft 114 with a tapered nock end.

The second stop assembly inner diameter of the nock adapter 132 may be adapted for snug engagement with an outer diameter of a projection of the nock 118. For example, the nock 118 may include an extension for inserting into the nock adapter 132 to create a threadless friction fit. This may allow for ease of removal and replacement of a nock in use.

The stop assembly 124 may further include a first engagement means for engaging a second engagement means of the slide assembly 120 for preventing or inhibiting relative longitudinal movement or rotation between the stop assembly and the slide assembly. The first engagement means and the second engagement means may include any of a projection, notch, lip, rib, flat, groove, recess, or channel, such that upon engagement of the first and second engagement means, the slide and the stop are hindered from moving with respect to one another.

The slide assembly and the stop assembly may comprise a rigid material. In one aspect, one or both of the slide assembly and the stop assembly may comprise a resilient material that may provide further dampening effect upon impact of the slide assembly with the stop assembly.

Figure 4A:
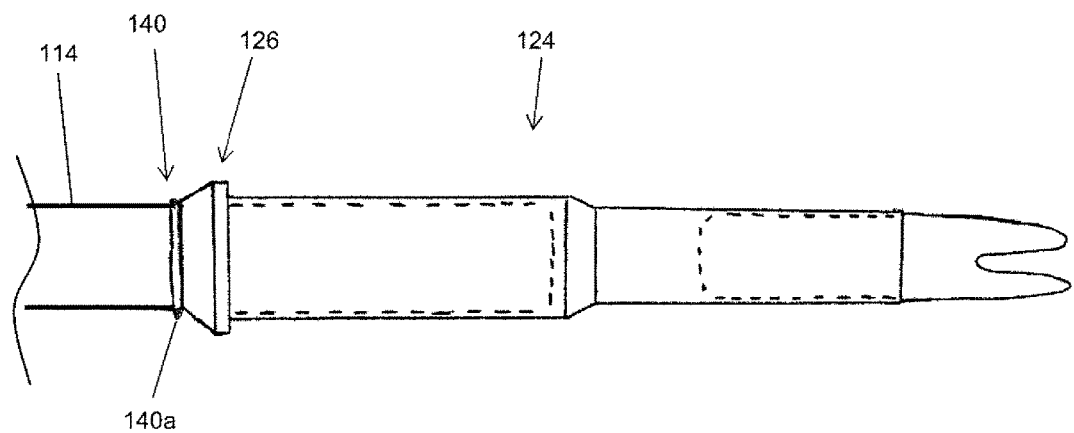
FIG. 4a is a side view of a further embodiment of a stop assembly.
Figure 4B:
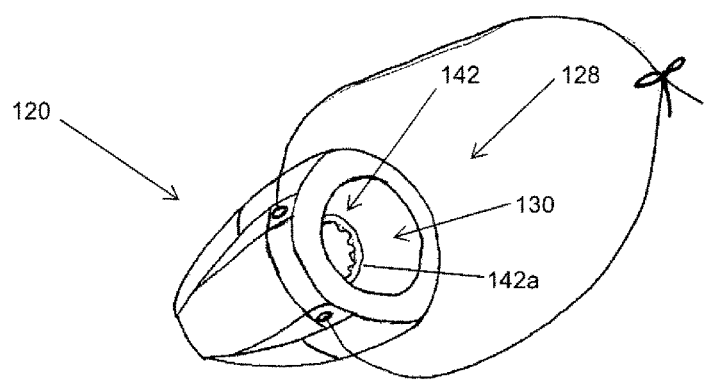

FIGS. 4a and 4b illustrate a first and second engagement means adapted to prevent relative longitudinal movement between the slide and the stop. FIG. 4a shows that the first engagement means may be in the form of a projection 140. As illustrated, the projection 140 may be an O-ring 140a. With reference to FIG. 4b, the second engagement means may form a recess 142, such as the circumferential channel 142a. As the slide assembly 120 slides rearward on the arrow shaft 114, the dampener 126 is received in the receiver 128. Upon doing so, the first engagement means, namely the projection 140 (or O-ring 140a) engages the second engagement means, namely the recess 142 (or circumferential channel 142a), such as by slipping the O-ring 140a into the circumferential channel 142a. The projection 140 may mate with the recess 142, with the projection being fixedly received therein. This engagement of projection 140 and recess 142 may prevent the slide assembly 120 from longitudinally disengaging from the stop assembly 126.

FIGS. 5a-7b illustrate examples of first and second engagement means that may prevent relative rotational movement between the slide and the stop. As can be seen in FIGS. 5a-5b, the slide assembly 120 may include a second engagement means, such as a recess in the form of opening 142b. The opening 142b may be positioned on a nock-end of the cavity 130 of the receiver 128. The opening 142b may be formed by wall 150, which may form a non-circular cross-section or perimeter about the receiver 128 when viewed from the nock-end of the slide assembly. For example, the wall 150 forming opening 142b may be in the form of a polygon, such as a pentagon, hexagon, heptagon, or octagon. As can be seen in FIG. 5b, the slide assembly 120 may be formed such that opening 142b opens to cavity 130, which tapers down to the interior bore 121 of the slide assembly 120, through which the arrow shaft 114 is adapted to run.

As illustrated in FIG. 5a, the interior bore 121 may be non-circular in shape. For example, the interior bore 121 may be polygonal or floriform in shape, or may include any number of grooves or recessed and raised cross-sectional elements. This may allow for the slide to easily slide along the arrow shaft 114, while the grooves, recesses, or raised cross-sectional elements may allow mud, sand, and other particles to escape and not hinder longitudinal movement of the slide.

Turning to FIGS. 5c-5d, a stop assembly 124 for use with the slide assembly of FIGS. 5a-5b is illustrated. The dampener 126 of the stop assembly 124 may include the first engagement means, such as a projection 140 in the form of extension member 140b. Extension member 140b may extend radially from a perimeter of the dampener 126, such as at a nock-end of the dampener. The extension member 140b may extend from only a portion of the perimeter of the dampener, less than the entirety of the perimeter of the dampener. In use, extension member 140b may be adapted to mate with the opening 142b such that engagement between the extension member 140b and the opening 142b prevents relative rotation therebetween.

With reference to FIG. 5c, extension member 140b includes a first flat element that is adapted to engage at least a portion of the wall 150 of opening 142b, whereby insertion of the extension member 140b into opening 142b locks the rotational position of the slide assembly 120 with respect to the stop assembly 124. In one aspect, the extension member 140b matches at least a portion of the cross-section of opening 142b. In another aspect, the extension member 140b may match an entirety of the cross-section of opening 142b. As illustrated, opening 142b of FIG. 5a includes an octagonal outer perimeter including eight flat sides. As the slide assembly 120 engages stop assembly 124, the dampener body 127 enters the cavity 130, and the extension member 140b enters the opening 142b. Due to the non-circular nature of the cross-section of the opening 142b and the flat element of the extension member 140b, the slide assembly 120 is prevented from rotating about the arrow shaft 114. Although not shown, the extension member 140b may take the same shape as the opening 142b, such as a matching non-circular cross-section (e.g. a polygon or a rounded polygon), such that the extension member 140b fills the opening 142b.

As can be seen in FIG. 6a, the slide assembly 120 may include the second engaging means, such as a recess in the form of opening 142c, in which the wall 150 may include one or more notches or niches. As illustrated, the opening 142c is in the form of a floriform shape. FIG. 6b illustrates that the first engaging means, such as a projection or an extension member of dampener 126, may be in the form of a rib 140c. This rib 140c may be adapted to be received within one of the notches or niches of opening 142c, thereby preventing relative rotation of the slide assembly 120 with respect to the stop assembly 124.

Figure 7A:
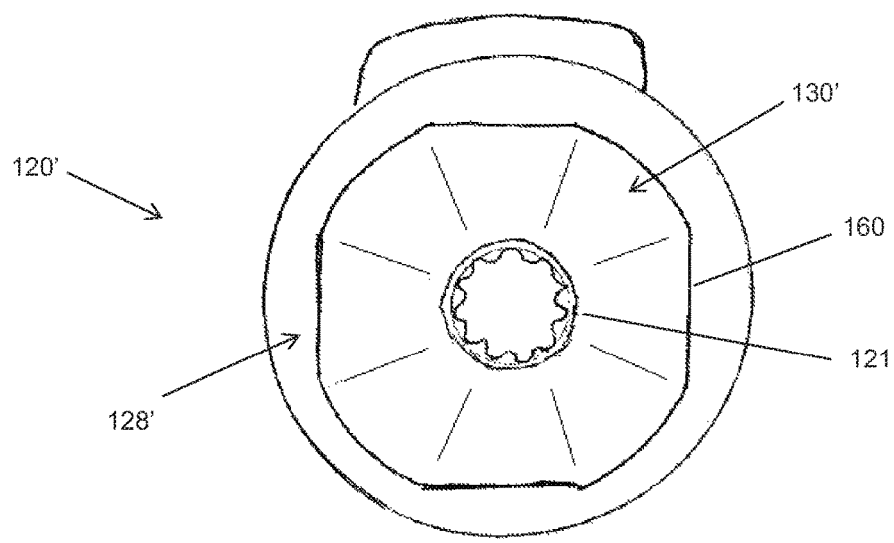
FIG. 7a is an end view of a further embodiment of a slide assembly.
Figure 7B:
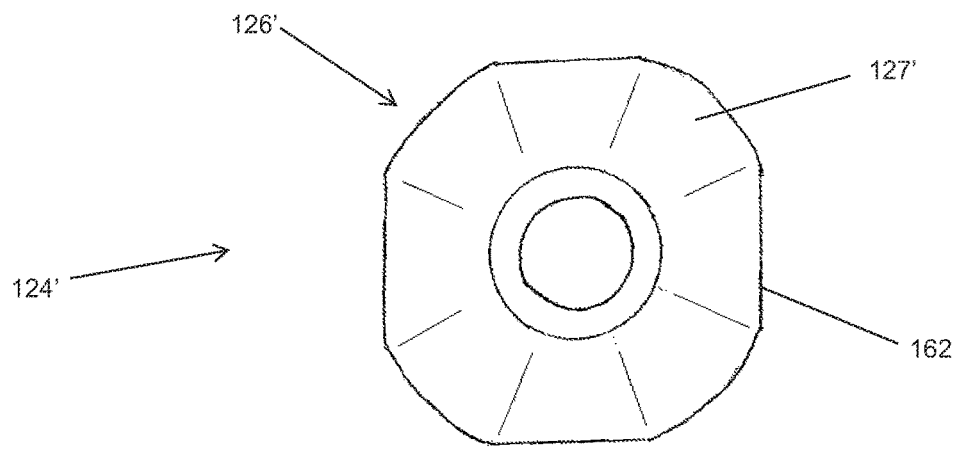

In another aspect, as illustrated in FIGS. 7a-7b, the first and second engaging means may be integral with the receiver 128 and the dampener 126. FIG. 7a illustrates a slide assembly 120' which may include a receiver 128' with a cavity 130' that is non-circular in cross-section, said non-circular cross-section of the cavity 130' being the second engaging means. As illustrated, the cavity 130' includes a perimeter 160 which takes the form of a rounded polygonal cross-section, namely a rounded square. This cavity 130' tapers radially inwardly from a larger non-circular perimeter 160 at a nock-end of the receiver 128' to the interior bore 121. In one aspect, the cavity 130' may taper inwardly from the non-circular perimeter 160 to a circular inner diameter. The perimeter 160 may have any non-circular shape, such as a polygon (e.g. a pentagon, hexagon, heptagon, or octagon), a rounded polygon, or a floriform shape.

FIG. 7b shows that a stop assembly 124' may include a dampener 126' with a dampener body 127' that is of a matching shape to the cavity 130' of the slide assembly 120'. In this respect, the matching (non-circular) shape of the dampener body 127' is the first engaging means. As shown the dampener body 127' includes a dampener outer perimeter 162 which is non-circular in cross-section. The dampener outer perimeter 162 may be formed at a nock-end of the dampener body 127', and the dampener body 127' may taper radially inwardly toward the arrowhead end of the dampener 126'. In one aspect, the dampener body 127' may taper inwardly from the non-circular dampener outer perimeter 162 at the nock-end of the dampener body 127' to the inner bore of the dampener, such as at an arrowhead end of the dampener 126'.

In practice, as the slide assembly 120' engages the stop assembly 124', the dampener body 127' enters the cavity 130'. Due to the matching non-circular nature of the perimeter 160 of the cavity 130' and the dampener outer perimeter 162 of the dampener body 127', relative rotation between the slide assembly 120' and the stop assembly 124' is prevented.

Figure 8:
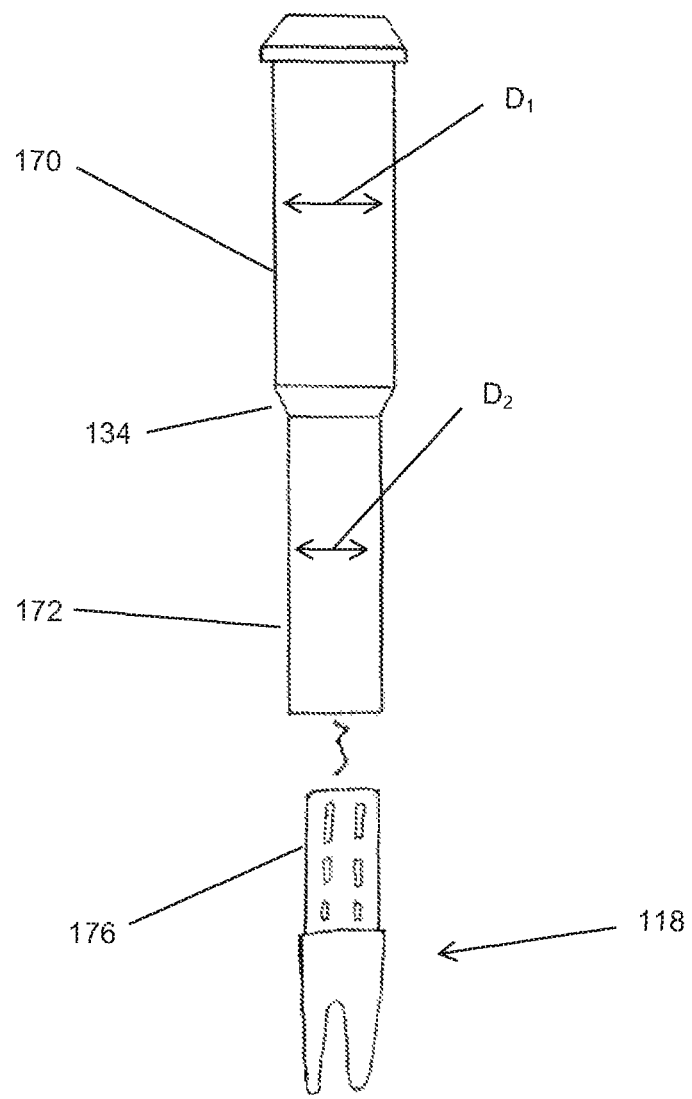
FIG. 8 is a side view of a stop assembly and nock.

Turning to FIG. 8, an exploded view of the stop assembly 124 and the nock 118 is shown. As shown, the stop assembly 124 may include a first portion 170 including a first inner diameter $D_1$ and a second portion 172 including second inner diameter $D_2$. The first inner diameter $D_1$ may be larger than the second inner diameter $D_2$. In one aspect, the first inner diameter $D_1$ may be of a matching diameter as the arrow shaft 114 and may be adapted to contact an entire circumference of the arrow shaft, such as at a nock-end of the arrow shaft, and fit tightly thereover. The tapered portion 134 of the stop assembly 124 may connect the first portion 170 with the second portion 172.

The second portion 172 of the stop assembly 124 may include the nock adapter 132 for engaging the nock 118. The nock adapter may be in the form of an aperture for receiving the nock. As illustrated, the nock 118 may include a nock extension 176 for insertion into the nock adapter. The nock extension 176 and the nock adapter 132 may be adapted for a threadless engagement therebetween, such as a friction fit. The nock adapter may be circular or non-circular in cross-section, and may be adapted to engage a nock with a circular or non-circular cross-section. For example, the nock adapter 132 may include a polygonal, rounded polygonal, or reuleaux triangular cross section, and may prevent relative rotation between the nock 118 and the nock adapter 132, such as is described in U.S. patent application Ser. No. 14/993,599 and 15/283,825, the disclosures of which are incorporated herein by reference.

The cross-section of the first portion 170 and the second portion 172 of the stop assembly may be the same or different shapes. For example, they both may be circular in cross-section, they both may be non-circular in cross-section, or one may be circular and the other may be non-circular. For example, the cross-section of the first portion 170 may be circular and may be adapted to engage a circular arrow shaft 114, while the second portion 172 of the stop assembly 124 may be non-circular in cross-section and may be adapted to engage a non-circular nock, thereby preventing relative rotation between the stop assembly 124 and the nock 118.

Figure 9:
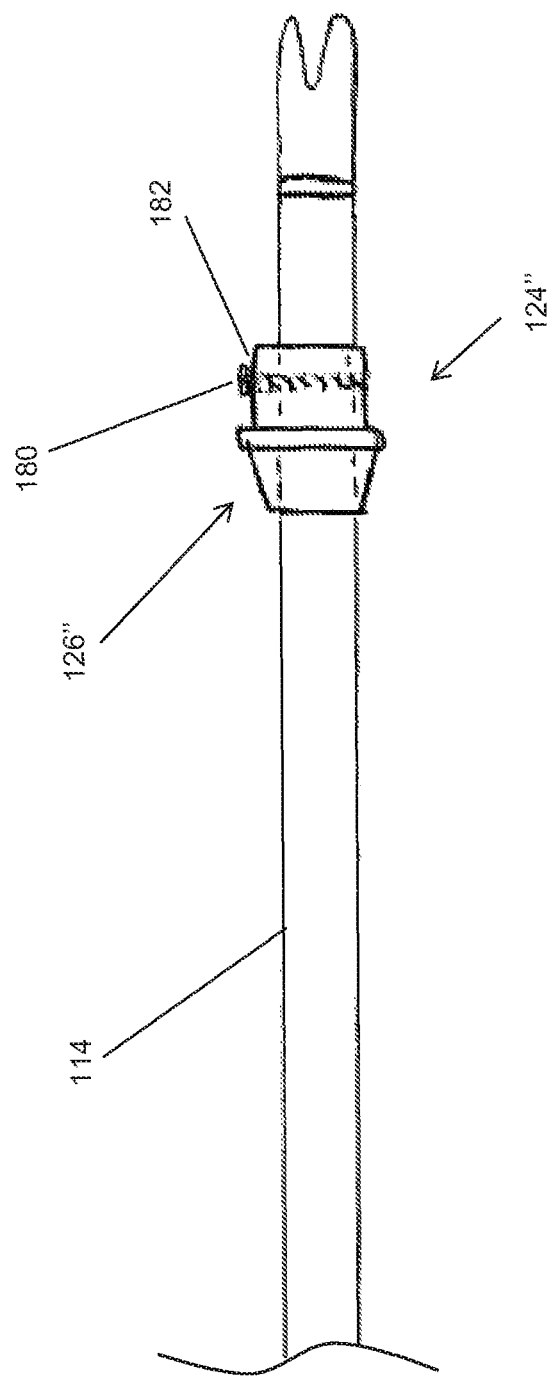
FIG. 9 is a side view of a further stop assembly.

In one embodiment, as illustrated in FIG. 9, a stop assembly 124" may be provided on an arrow shaft 114. The stop assembly 124" extends circumferentially around the arrow shaft 114, but does not cover a nock end of the arrow shaft. The stop assembly 124" may include a tapered dampener 126" that may take the form of any dampener disclosed herein, and may be adapted to engage any corresponding slide assembly disclosed herein. The stop assembly 124" may be adapted to engage a conventional arrow shaft which includes an opening for receiving a fastener 180 for attaching the stop assembly 124" to the shaft. For example, the stop assembly 124" may include an aperture 182 for receiving the fastener 180 and fixing the stop assembly 124" to the shaft 114. In one aspect, the aperture 182 of the stop assembly 124" is adapted to align with an opening of the shaft, and the fastener 180 is adapted to pass through both the aperture 182 of the stop assembly and the opening on the shaft 114. In another aspect, the fastener 180 and one or more of the aperture 182 and the opening on the shaft 114 may be threaded and adapted for threaded engagement. The fastener 180 may be used to attach any stop assembly described herein to shaft 114, including a stop assembly 124 which is adapted to cover the nock end of the shaft, such as those of FIGS. 3-8.

While the invention has been described with reference to specific examples, it will be understood that numerous variations, modifications and additional embodiments are possible, and all such variations, modifications, and embodiments are to be regarded as being within the spirit and scope of the invention. For example, the first mating portion of the stop assembly may be in the form of a receiver, and the second mating portion of the slide assembly may be in the form of a tapered body similar to the above-described dampener. Also, the drawings, while illustrating the inventive concepts, are not to scale, and should not be limited to any particular sizes or dimensions. Accordingly, it is intended that the present disclosure not be limited to the described embodiments, but that it has the full scope defined by the language of the following claims, and equivalents thereof.

The invention claimed is:

1. A bowfishing apparatus for use with an arrow shaft with a arrowhead portion and a nock end portion, said apparatus comprising:
   a slide assembly including an interior bore and a circumferential receiver defining a cavity with an interior surface tapering radially outward from the interior bore toward a rear end of the slide assembly facing the nock end portion of the arrow shaft, said slide assembly adapted to slide longitudinally along and rotate about the arrow shaft; and
   a stop assembly adapted to be fixedly attached to the arrow shaft, said stop assembly including a circumferential dampener tapering radially outward toward the nock end portion of the arrow shaft, said dampener adapted for at least partial insertion into the receiver of the slide assembly.

2. The bowfishing apparatus of claim 1, wherein the stop assembly further includes a nock receiver for receiving at least a portion of a nock.

3. The bowfishing apparatus of claim 1, wherein the stop assembly is adapted to be fixedly attached around a circumference of an outer surface of the shaft.

4. The bowfishing apparatus of claim 1, wherein the cavity defines a first shape and the dampener of the stop assembly includes a dampener body with a second shape, and wherein the first shape matches the second shape.

5. The bowfishing apparatus of claim 4, wherein the dampener further includes a projection, and the receiver further includes a recess for receiving the projection.

6. The bowfishing apparatus of claim 5, wherein the projection comprises an O-ring adapted for insertion into the recess, thereby inhibiting longitudinal movement of the slide assembly.

7. The bowfishing apparatus of claim 5, wherein the recess comprises a wall defining a non-circular perimeter, and the projection comprises an extension member adapted to engage at least a portion of the wall, and wherein engagement of the extension member and the wall prevents relative rotation of the slide assembly and the stop assembly.

8. The bowfishing apparatus of claim 1, wherein the cavity of the circumferential receiver includes a first non-circular cross-section and the dampener includes a second non-circular cross-section matching the first non-circular cross-section, said first non-circular cross-section adapted for engaging said second non-circular cross-section, and wherein engagement of the first non-circular cross-section with the second non-circular cross-section prevents relative rotation of the slide assembly and the stop assembly.

9. The bowfishing apparatus of claim 1, further including a fastener for attaching the stop assembly to the shaft, and wherein the stop assembly further includes an aperture on a radially outer surface of the stop assembly for receiving the fastener.

10. A bowfishing apparatus for use with a reel and bowfishing line, said apparatus comprising:
    an arrow shaft including an arrowhead end and a nock end and defining an outer surface;
    a slide assembly adapted for attachment to the bowfishing line and for longitudinal and rotational movement about the arrow shaft; and
    a stop assembly including an aperture, said aperture adapted for covering the nock end and a nock end portion of the radially outer surface of the arrow shaft, said stop assembly including
       a dampener for engaging the slide assembly and preventing longitudinal movement of the slide assembly beyond the nock end; and
       a nock receiver for receiving a nock.

11. The bowfishing apparatus of claim 10, wherein the stop assembly includes:
    a first section including the aperture with a first inner diameter matching an outer diameter of the shaft, said first section for covering and contacting the radially outer nock end portion of the outer surface of the arrow shaft; and
    a second section, said second section extending beyond the nock end and including the nock receiver, said nock receiver defining a second inner diameter matching an outer diameter of at least a portion of the nock;
    wherein the first inner diameter is larger than the second inner diameter.

12. The bowfishing apparatus of claim 10, wherein the slide assembly includes a line receiver for engaging the bowfishing line.

13. The bowfishing apparatus of claim 10, wherein the slide assembly includes a circumferential receiver tapering outward toward the nock end, said circumferential receiver adapted for receiving the dampener.

14. The bowfishing apparatus of claim 13, wherein the dampener comprises a circumferential dampener tapering radially outward toward the nock end of the arrow shaft, said circumferential dampener adapted for at least partial insertion into the circumferential receiver the slide assembly.

15. The bowfishing apparatus of claim 14, wherein the circumferential receiver and the circumferential dampener comprise matching frustoconical shapes.

16. The bowfishing apparatus of claim 14, wherein the circumferential receiver comprises a concave shape and the circumferential dampener comprise a matching convex shape.

17. The bowfishing apparatus of claim 13, wherein the slide assembly further includes a recess and the dampener includes a projection adapted to engage the recess.

18. The bowfishing apparatus of claim 17, wherein the recess comprises a circular recess within the circumferential receiver and the projection comprises an O-ring.

19. The bowfishing apparatus of claim 17, wherein the recess comprises a wall defining a non-circular perimeter, and the projection comprises an extension member adapted to engage at least a portion of the wall, and wherein engagement of the extension member and the wall prevents relative rotation of the slide assembly and the stop assembly.

20. The bowfishing apparatus of claim 10, wherein the nock receiver is threadless, and is adapted to engage a threadless nock.

* * * * *